Patented July 4, 1939

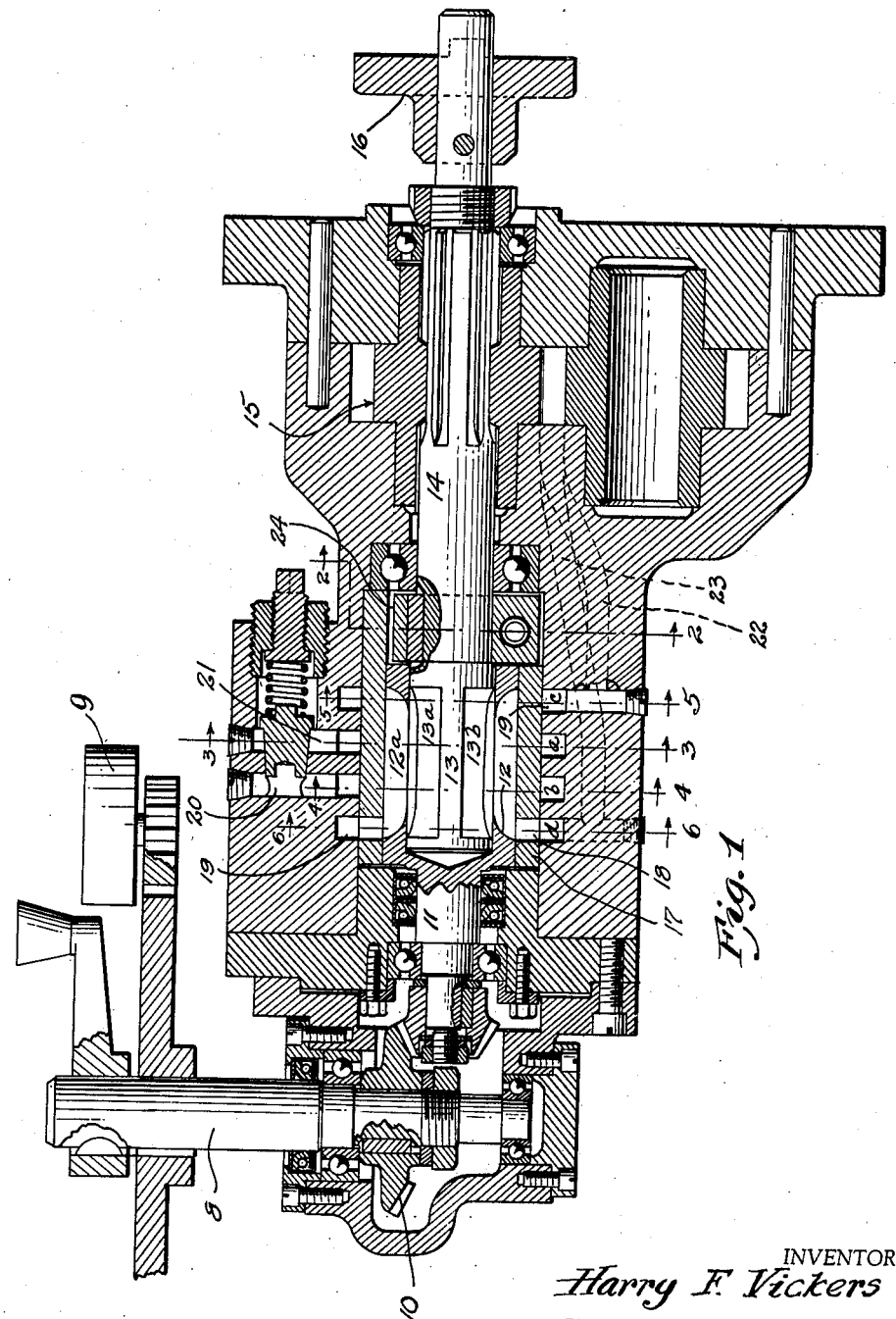

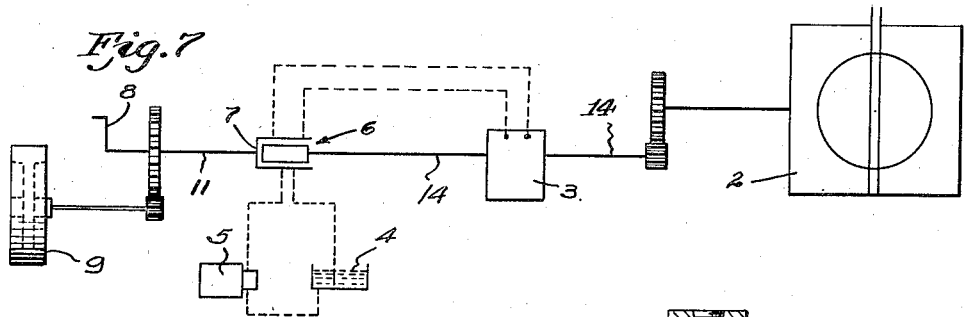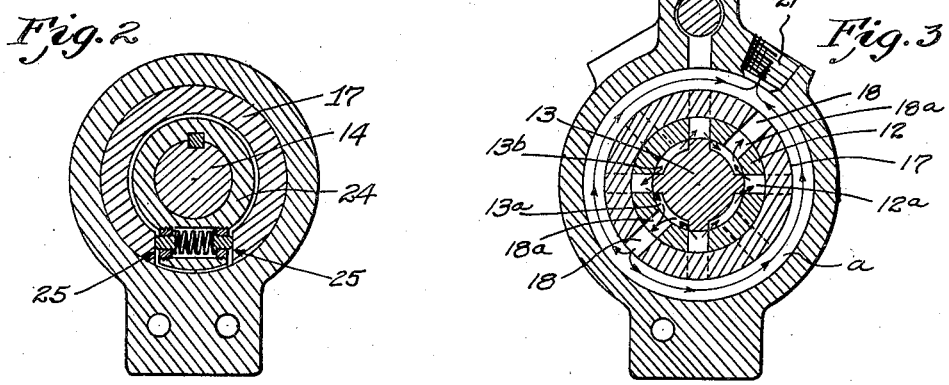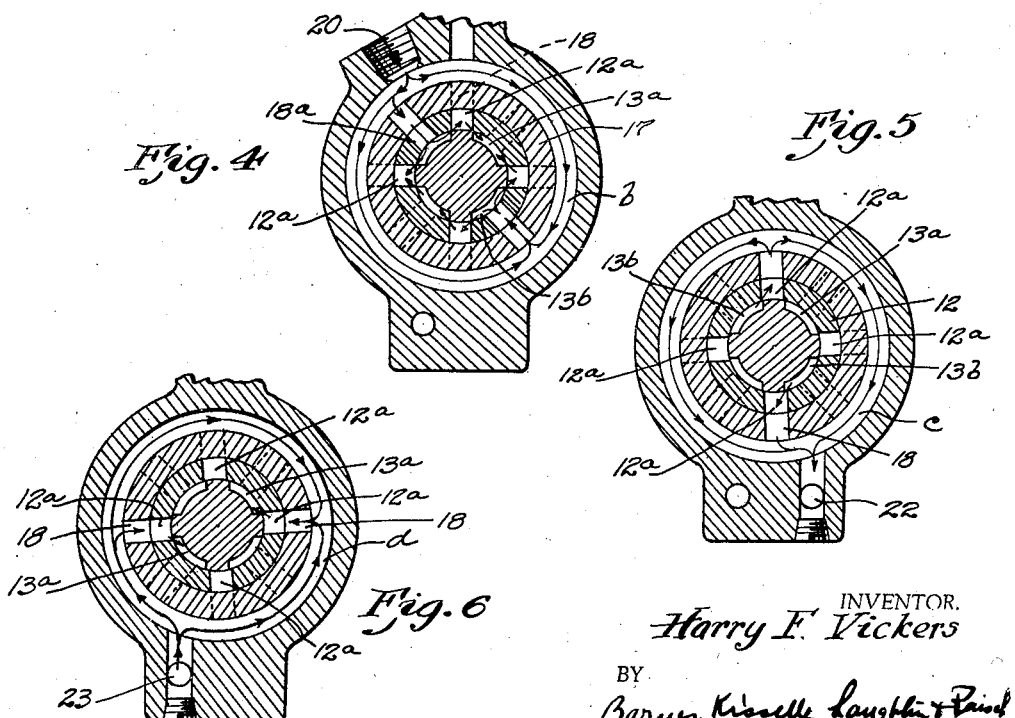

2,164,971

UNITED STATES PATENT OFFICE 2,164,971

APPARATUS FOR GOVERNING MOVEMENT OF HAND CONTROLLED POWER TRANSMISSION

Harry F. Vickers, Detroit, Mich.

Continuation of application Serial No. 26,800, June 15, 1935. This application July 28, 1938, Serial No. 221,838

4 Claims. (Cl. 121—41)

This application is a continuation of application Serial No. 26,800, filed June 15, 1935, and now abandoned.

This invention relates to apparatus for governing movement of hand controlled power transmission, and has to do particularly with power driven mechanism of large mass actuated by a remote control hand crank through a follow up unit.

Heretofore in power transmission systems embodying remote hand actuation and control of relatively large masses, such as ship steering gears and the like, it has been a general practice to transmit movement of the hand crank through a suitable follow up means, electric or hydraulic, to control the application of power to the large mass to be moved. The application of the power itself to the driven mechanism has been simple enough, but much difficulty has been experienced in devices of this kind, over a great many years, in the initial acceleration and final deceleration of the driven mechanism. Oftentimes the driven mechanism of large mass, such as a ship rudder requires quick movement or quick stopping; this in turn required quick movement or quick stopping of the hand crank, often resulting in breakage of connecting mechanism because of the large mass of the driven mechanism. In some instances the driven mechanisms have required smooth and uniform acceleration or deceleration, this has been almost impossible to accomplish at the hand crank, event with the most skilled operators. Electrical control units have been subject to the disadvantage of getting out of phase.

It is an object of the present invention to provide means for automatically governing the rate of acceleration or deceleration that may be given a certain mass by a remote control hand crank whereby to smooth out the start or stop of the mass to positively prevent any breakage and, in addition, to insure uniform predetermined acceleration or deceleration.

More specifically, the present invention contemplates a remote control power transmission system embodying a driven mechanism of relatively large mass, a primary motor for driving such mass, a pump or generator or other source of power communicating with said motor through suitable follow up valve or mechanism, a hand crank for controlling the movement of one part of the follow up valve or means, and an inertia governor so proportioned relative to the mass as to insure a predetermined acceleration or deceleration of the mass.

Further features have to do with details of the remote control transmission system and mechanism for carrying out the same, as will be more clearly set forth in the specification and claims.

In the drawings:

Fig. 1 is a longitudinal sectional view through one type of power transmission unit wherein the hydraulic follow up valve and motor are in longitudinal alignment.

Figs. 2 to 6 are sectional views taken on lines 2—2 to 6—6 of Fig. 1 and showing in particular the various positions of the follow up valve parts.

Fig. 7 is a diagrammatic view of a complete transmission system embodying the present invention and embodying hydraulic power units and a hydraulic follow up valve.

A general understanding of the invention will be best had by referring to the diagrammatic showing in Fig. 7 wherein 2 represents the driven mechanism of a large mass, 3 a hydraulic motor supplying the power for moving said mass, 4 a liquid reservoir and 5 an electric motor and pump for supplying oil under pressure to the motor 3. A follow-up valve 6 having a movable element 7 is controlled by hand crank 8, and an inertia governor 9 is geared to the hand crank 8 and so proportioned as to insure that the acceleration rate of the crank 8 by a man turning the same shall be an amount below the acceleration rate of the mass 2 with the power available. The resistance to movement of the hand crank 8 is practically zero without the governor, and this would permit the control part of the follow-up valve to be moved by the operator at rates beyond the acceleration rate of the driven member 2. It will thus be seen that the correct proportioning of the inertia governor 9 to the mass and the power available to drive the same will result in the positive governing of the rate of acceleration to prevent changes of velocity in the driven member and to prevent any possibility of breakage. In addition, the positioning of the governor between the hand crank and the follow up valve insures a steadying influence against rapid starting or rapid deceleration so as to insure a uniform acceleration or deceleration.

In Figs. 1 to 6 I have illustrated the preferred mechanical embodiment of the diagrammatic showing of Fig. 7 wherein the hand crank member is represented as at 8 connected by means of suitable bevel gears 10 with the hand controlled element 11 of a rotary balanced follow up valve. This member 11 consists of an annular slotted sleeve 12 which is adapted to rotate relative to or with a cylindrical valve member 13 which is integrally connected with the main operating shaft 14 driven by a hydraulic gear motor generally designated 15 which is connected by means of a coupling member 16 with the driven mechanism of relatively great mass. Diametrically positioned slots 12a are adapted to cooperate with longitudinal valve members or ridges 13a and 13b formed in the cylindrical inner valve member 13. In the preferred form the slots 12a are slightly wider than the ridges 13a and 13b so that in normal neutral position the oil is free to flow from one depression in the valve member 13 to the other, as best illustrated in Figs. 3 and 4.

A sleeve 17 is adapted to be secured to or forms a part of the sleeve 12 and this sleeve 17 is provided with a plurality of ports 18 both circumferentially and longitudinally spaced. The inner walls of the follow up valve housing are provided with spaced annular grooves 19 which are adapted to cooperate or align with the respective ports 18 of the sleeve 17, the longitudinally and circumferentially spaced ports 18 being so arranged as to at all times connect the depressions of the valve part 13 with the proper annular grooves 19 regardless of the position of the shaft 11 and the annular sleeve 12 connected thereto.

Operating fluid for actuating the motor 15 is supplied to conduit 20 and exhausted through conduit 21. Inasmuch as the motor shaft 14 is adapted to be directly connected to a driven member of large mass, it will be obvious that accurate, positively controlled movement of the shaft 14 is important at all times. Flow of pressure fluid between the follow up valve and motor is by means of the conduits 22 and 23 which lead to and from the intake and exhaust chambers of the gear motor in the usual manner.

To insure accurate control of the driven member 2, I preferably utilize a follow up retarding device 24 of the type best indicated in Fig. 2. As shown in Fig. 1, one end of the follow up valve represented by the sleeves 12 and 17 is cut away to receive the retarding centering lug 24. Spring pressed lugs of the retarding device 24 contact with accurately machined surfaces 25 which are accurately predetermined relative to the respective grooves in the follow up valve so as to insure that the control valve will always assume a positively neutral position on being centered. It will be seen that with these parts of the retarding device and the cut away portion of the sleeve accurately machined the grooves in the one portion of the follow up device will be positively centered relative to the grooves in the other portion of the follow up device. Displacement of the follow up member 11 relative to the follow up portion 13 will result in practically instantaneous movement of the motor 15 and hence substantially instantaneous movement of the other follow up part 13. As long as the control shaft 11 is continuously turned in either direction the member 24 and the valve part 13 will follow this movement, but the instant the hand controlled shaft 11 is stopped, then the valve sleeve 17 will be positively retarded and neutralized relative to the extending lug on the retarding device 24, with the result that the driven member will come to a stop at the exact point predetermined by the stopping of the hand actuated shaft 11, and thus prevent any overrun of the motor 14 and driven member which would otherwise be caused by friction between the follow up valve parts.

Operation of the follow up device, which is so important in connection with the inertia governor, may be best illustrated by referring to Figs. 2 to 6 which represent sections taken on lines 2—2 to 6—6 of Fig. 1. The circular grooves 19 upon which the sections are taken are lettered a, b, c and d, respectively. The sleeve 12 is provided with four slots or grooves 12a and four diametrically positioned apertures 18a equidistantly positioned between the slots. The outer sleeve 17 has eight apertures 18 which are in alignment with the slots 12a and apertures 18a of the sleeve 12, such apertures 18 and 18a being arranged so that they correspond with the proper grooves a, b, c and d in the housing. The raised portions between the depressions 13a and 13b and the valve 13 are preferably of a width slightly less than the width of the grooves 12a so that with the valve sleeve 12 in central position, fluid will pass through the ports 18 of the sleeve 17, which are in alignment with said ports 18a, and as the raised portions of the valve 13 are of less width than the grooves 12a, the fluid will pass from the diametrically opposite depressions 13b into adjacent diametrically opposite depressions 13a. Fluid flowing past the raised portions of the valve 13 and entering diametrically opposed depressions 13a will pass out through the registering ports 18a and 18 and then by way of annular groove a, enter the outlet conduit 21. Thus, while oil will be continuously supplied equally to both opposed working chambers of the motor, the continuous circulation of fluid, as shown in Figs. 3 and 4, permits the use of a continuously operating pump, and all the parts being diametrically arranged, as shown, will result in a completely balanced follow up valve structure. Both parts of the follow up valve are balanced at all times, any incoming or outgoing pressure on one side is equally counterbalanced on the other side, whether internal or external.

Actuation of the shaft 11 will result in movement of the sleeve 12 relative to the central follow up valve member 13 so that, referring to Fig. 5, the outlet from the depressions 13b is confined to a single slotted portion 12a with the result that fluid flowing into the depressions 13b from the inlet port 20 will be conducted through the conduit 22 to the motor 15, while fluid from the exhaust chamber of the motor will be pumped back through the conduit 23, annular groove d and into the depressions 13a and back to the pump through the conduit 21. Actuation of the motor 15 will, of course, actuate the shaft 14 to control the movement of the driven member 2 of large mass. This movement will be transmitted back through the shaft 14 so that the inner valve member 13 will follow up the outer valve member 12 until the hand actuated shaft 11 stops, when the valve ports will be positively neutralized by means of the retarding mechanism shown in Fig. 2; it being understood that the spring of the retarding device 24 is of just sufficient strength to overcome the friction between the follow up valve parts. Thus all over travel is eliminated without in any way affecting the continuous hydraulic control through the follow up valve.

In the preferred showing and modifications it will be obvious in every instance that the resistance to movement of the hand crank would be practically zero without the inertia governor which would permit the hand control to be moved by the operator at rates beyond the safe acceleration rate of the driven member 2 of relatively great mass. By proportioning the inertia governor relative to the size of the driven member 2 and the power available, it is thus possible to govern the acceleration or deceleration of the hand operated shaft whereby to positively predetermine that such rate of acceleration or deceleration is below the acceleration or deceleration rate of the driven member with the given power available.

It will be understood that the ports of the follow up valve, as illustrated in Figs. 3 to 6, may be closed in center position instead of open, as illustrated, so as to obtain a locking action. In such a case some other means will be provided for circulating the fluid pressure or a different type of pump can be used. Where open ports are used as illustrated in Figs. 2 to 6, outside mechanical means can be utilized to obtain the locking action.

What I claim is:

1. In a power transmitting system of the type having a driven member of relatively large mass, power amplifying means directly connected to said mass for controlling the actuation thereof, a source of power supply, and a rotary hand operated control member for controlling the flow of power to said power amplifier and the actuation of said mass, a follow up unit interposed between the power supply and power amplifier, said unit comprising relatively freely movable parts, one of said parts being connected to the control member and another part being connected to the power amplifier, said connection between the control member, follow up unit and power amplifier being such that the resistance to movement of the control member is practically zero, and an inertia governor operatively connected to said hand control member for governing the rate of acceleration applied to said control member by the operator, the effective mass of said inertia governor being proportioned to the relative available power for actuating said driven member.

2. In a power transmitting system of the type having a driven member of relatively large mass, power amplifying means directly connected to said mass for controlling the actuation thereof, a source of power supply, and a rotary hand operated control member for controlling the flow of power to said power amplifier and the actuation of said mass, a follow up unit interposed between the power supply and the power amplifier, said unit comprising relatively freely movable parts, one of said parts being connected to the control member and another part being connected to the power amplifier, said connection between the control member, follow up unit and power amplifier being such that the resistance to movement of the control member is practically zero, and an inertia governor in the form of a fly wheel mechanically connected to the hand operated control member for governing the rate of acceleration of said member to in turn govern the rate of acceleration of the driven member, the effective mass of said fly wheel being proportioned relative to the mass of the driven member and the power available whereby to limit the acceleration rate of the effort of the operator to an amount below the acceleration rate of the relatively large mass with the power available.

3. In a power transmitting system of the type having a driven member of relatively large mass, a fluid motor for driving said mass, a source of power supply, and a follow up mechanism interposed between said power supply and motor, said follow up mechanism including two relatively movable parts for controlling the flow of fluid therethrough, one of said parts being rotatably mounted, and a hand crank for controlling the movement of said mass and connected to said rotary movable part of said follow up mechanism, the structure of the follow up mechanism being such that the resistance to movement of the rotary part connected to said hand crank is relatively small, and an inertia governor operatively connected to said hand crank for governing the rate of acceleration applied to the hand crank by the operator.

4. In a power transmitting system of the type having a driven member of relatively large mass, an amplifier in the form of a hydraulic motor of predetermined power for driving said mass, a source of power supply for said motor, and a follow up valve interposed between said power supply and said motor, said follow up valve comprising two relatively freely movable parts one part being directly connected to the operating part of the motor and the other part being directly connected to a hand crank, said two parts of the follow up valve being arranged to control the flow of liquid therethrough but offering very little resistance to the movement of the part connected to the hand crank, and an inertia governor operatively connected to said hand crank and having an effective mass proportioned relative to the power available at the motor and to the mass of the driven member whereby to insure that the acceleration or deceleration rate of the hand crank of the average operator is below the safe acceleration or deceleration of the driven member with the given power available.

HARRY F. VICKERS.